US006693526B1

(12) United States Patent
Puccio

(10) Patent No.: US 6,693,526 B1
(45) Date of Patent: Feb. 17, 2004

(54) BRAKE LIGHT SYSTEM FOR A VEHICLE

(76) Inventor: Gasper P. Puccio, 15310 Clevedon La., Houston, TX (US) 77040

( * ) Notice: Subject to any disclaimer, the term of this patent is extended or adjusted under 35 U.S.C. 154(b) by 0 days.

(21) Appl. No.: 10/454,186

(22) Filed: Jun. 4, 2003

(51) Int. Cl.[7] .................................................. B60Q 1/44
(52) U.S. Cl. ..................... 340/479; 340/464; 315/200 A
(58) Field of Search ................................ 340/479, 463, 340/464, 478; 315/200 A

(56) References Cited

U.S. PATENT DOCUMENTS

| | | |
|---|---|---|
| 2,091,086 A | 8/1937 | Taylor |
| 2,734,105 A | 2/1956 | Perry |
| 3,336,575 A | 8/1967 | Lundahl |
| 3,576,529 A | 4/1971 | Garrison |
| 3,693,151 A | 9/1972 | Hasegawa et al. |
| 3,787,808 A | 1/1974 | Knopf |
| 3,939,316 A | 2/1976 | Stropkay |
| 4,107,647 A | 8/1978 | Yoshino |
| 4,320,384 A | 3/1982 | Carlson |
| 4,403,210 A | 9/1983 | Sullivan |
| 4,651,129 A | 3/1987 | Wood et al. |
| 4,663,609 A | 5/1987 | Rosario |
| 4,772,868 A | 9/1988 | Chen |
| 4,916,431 A | 4/1990 | Gearey |
| 4,918,424 A | 4/1990 | Sykora |
| 4,956,633 A | 9/1990 | Waterson et al. |
| 4,990,887 A | 2/1991 | Lee |
| 5,150,098 A | 9/1992 | Rakow |
| 5,345,218 A | 9/1994 | Woods et al. |
| 5,461,362 A | 10/1995 | Echt |
| 5,504,472 A | 4/1996 | Wilson |
| 5,610,578 A | 3/1997 | Gilmore |
| 5,786,752 A | 7/1998 | Bucalo et al. |
| 5,886,628 A | 3/1999 | Alhassoon |
| 6,020,814 A | 2/2000 | Robert |
| 6,025,775 A | 2/2000 | Erlandson |
| 6,054,919 A | 4/2000 | Demko |
| 6,150,933 A | 11/2000 | Matsumoto |
| H2001 H | 11/2001 | Pinkus |
| 6,356,190 B1 | 3/2002 | Albrecht |
| 6,424,256 B1 | 7/2002 | Ryder |
| 6,491,315 B2 | 12/2002 | Hagen et al. |
| 6,502,035 B2 | 12/2002 | Levine |
| 6,525,656 B1 | 2/2003 | Hahn |

*Primary Examiner*—Donnie L. Crosland
(74) *Attorney, Agent, or Firm*—Bracewell & Patterson LLP

(57) ABSTRACT

A brake light control assembly allows a driver to selectively flash the brake lights of a vehicle upon application of the brakes. The driver of the vehicle selectively determines the pattern of flashes of the brake lights depending upon driving conditions. The brake light control assembly includes a brake light interrupter circuit adapted to be connected to the vehicle for selectively interrupting illuminations of the brake light a predetermined number of times. The brake light control assembly has a switch that is selectively positioned to vary the number of times the illuminations of the brake lights are interrupted each time the brakes are applied. The switch is movable between various positions that correspond to different numbers flashes for the brake lights.

16 Claims, 3 Drawing Sheets

BRAKE LIGHT SYSTEM FOR A VEHICLE

BACKGROUND OF INVENTION

1. Field of the Invention

This invention relates generally to automotive vehicles and more specifically to a brake light control assembly.

2. Background of the Invention

The rear lights of vehicles help to communicate the actions and intentions of a driver to someone following the vehicle. For example, a single flashing taillight helps to indicate that the driver of the vehicle intends to turn left or right. In other situations, double flashing tail lights help to communicate that the driver of the vehicle believes there is some situation with the vehicle, the surrounding environment, or the driver that creates a hazardous or dangerous situation for other drivers. Brake lights also help to communicate to following drivers that the vehicle is either slowing down, or already stopped.

Brake lights are typically either separate lights, or a separate filament of the same light bulb that is used for the taillights so that brake lights can have a higher intensity than normal taillights. Brake lights on most automobiles generally consist of a pair of lights that are located toward both the passenger and driver sides on the rear end of the vehicle. As desired, sometimes a centrally located brake light is positioned in the center of the rear end to aid in the communication that the vehicle is braking rather than turning.

With most systems that are manufactured today, the brake lights are either illuminated or not. With such systems, if a driver communicates a braking action to a following driver beyond the simple illumination of the brakes, the driver would have to depress and release the brake pedal repeatedly to cause the brake lights to flash as desired. Flashing the brake lights of the vehicle can help to alert a following driver of impending reduction of speed of the vehicle. Pumping the brake pedal before applying the brakes as ultimately desired is not always practical or effective because a driver may not have time or may not remember flash the brake lights.

Several systems have been developed to automatically interrupt or cause the brake lights to flash upon application of the brakes by the driver. Many of the systems include electrical or mechanical sensors that detect rapid decelerations, which in turn causes the brake lights to illuminate in a manner different from normal. These systems may cause the brake lights to flash for a certain amount of time and remain illuminated, or flash until the rate of deceleration is below a predetermined amount. Instead of flashing or interrupting the lights, other warning systems vary the intensity of the lights in a similar manner. Common to the rapid deceleration systems is the problem that the brake lights flash or change intensity only if the deceleration rate surpasses the preselected value. Therefore, during slower or normal braking conditions the brake lights operate as usual.

Systems have also been developed that interrupt or cause the brake lights to flash a predetermined amount of time every time the driver applies the brakes of the vehicle. These systems typically use timers, magnetic coils, transistors, or heating elements to interrupt the illumination of the brake lights for a predetermined amount of time. These systems do not vary, nor allow the driver to vary the number of flashes when the brake pedal is depressed. Accordingly, the brake lights flash in the same manner every time the brakes are applied.

Other systems have also been developed that interrupt or cause the lights to flash in different manners depending on various conditions like vehicle speed, rate of deceleration, ambient driving conditions, angle of incline of the road, etc. These systems include sensors that detect these conditions, which then communicate the data to a central processing unit to automatically vary the brake lights. These systems do not allow a driver to select or monitor the illumination of the brake lights. Therefore, the vehicle's central processor controls how the brake lights illuminate based upon certain sensed data rather than allowing the driver to manipulate the brake lights as desired.

SUMMARY OF THE INVENTION

A brake light control assembly allows the driver of the vehicle to determine how many times the brake lights will flash or are interrupted before upon each application of the brakes. The brake light assembly includes a brake light interrupter circuit that is adapted to be connected to a vehicle with brake lights that are illuminated upon actuation of a brake assembly. The brake light interrupter circuit is also adapted to be in electrical communication with an electrical circuit of the vehicle between a battery and a brake light for selectively interrupting illuminations of the brake light a predetermined number of times.

A switch is selectively positioned to vary the predetermined number of times the illuminations of the brake lights are interrupted upon each actuation of the brake assembly. The switch is adapted to be connected within the passenger compartment of the vehicle so that the driver of the vehicle can select the number of times the brake lights flash upon each application of the brakes. Additionally, the switch is responsive to the driver so that the number of the times the illuminations of the brake lights are interrupted can be varied while the driver is driving the vehicle. The switch therefore allows the driver to change the number of times the brake lights flash, as desired, depending upon various driving conditions like traffic, weather, vehicle speed, and road conditions.

DETAILED DESCRIPTION OF THE PREFERRED EMBODIMENTS

Figure 1:
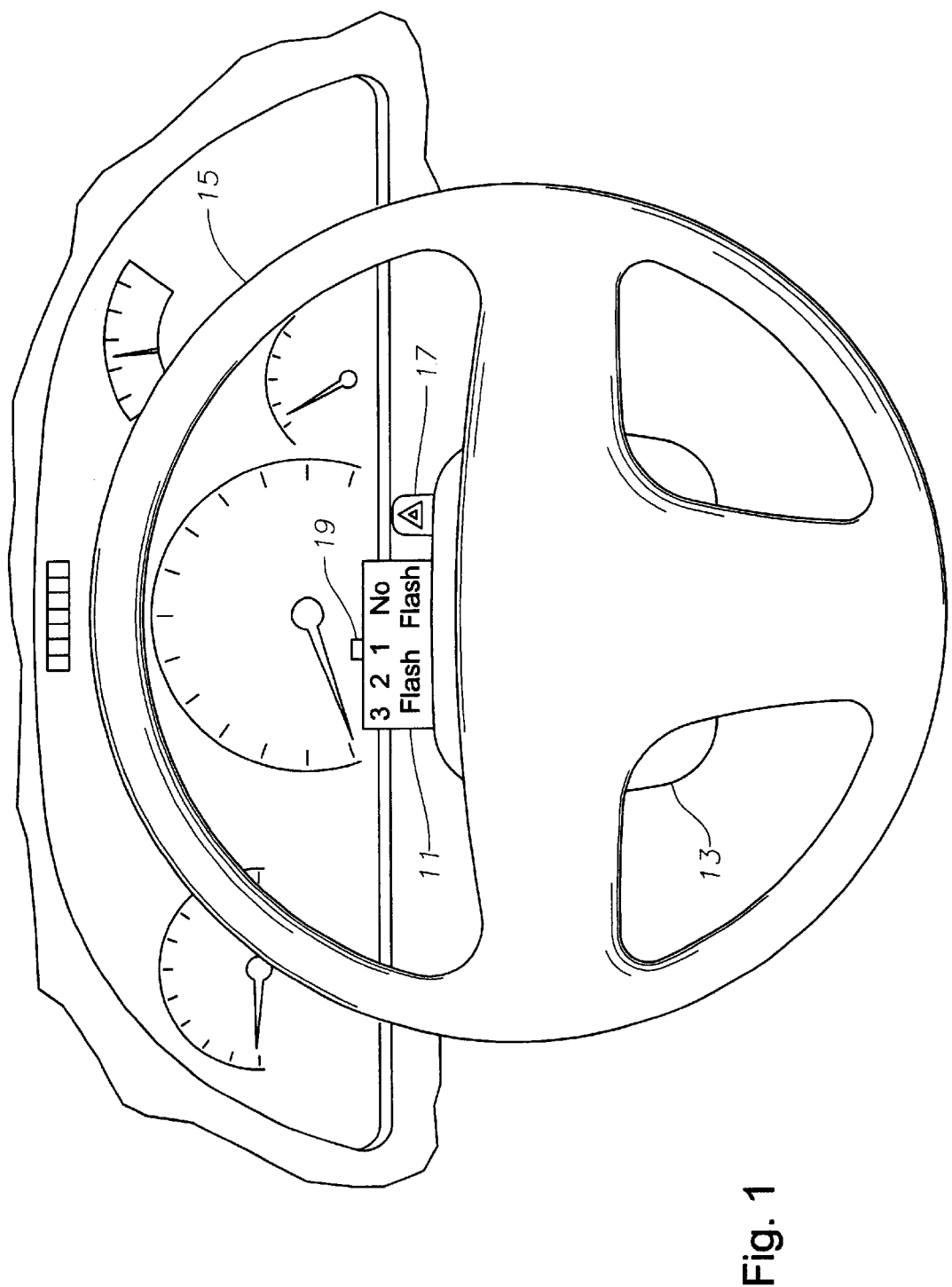
FIG. 1 is an environmental view of a brake light control assembly built in accordance with the present invention that is mounted to a steering column of a vehicle.

Referring to FIG. 1, a brake light control assembly 11 is shown connected to a steering column 13 extending between the dashboard and a steering wheel 15 of a vehicle. Brake light control assembly 11 is shown located by an adjacent hazard light switch 17 that is also connected to steering column 13 of the vehicle. In the preferred embodiment, brake light control assembly 11 preferably includes a switch 19 for the brake lights of the vehicle. Switch 19 is preferably selectively positioned by the driver of the automobile to vary the brake lights as they are illuminated upon application of the brake pedal. In the preferred embodiment, switch 19 can be positioned in a first position so that there is no flash, in a second position so that there is one flash before the brake lights continue to remain illuminated, or in a third position so that there are two flashes before the brake light is continuously illuminated, or in a fourth position so that there are three flashes before the brake lights are continuously illuminated. Switch 19 can alternatively comprise a plurality of buttons that are manually selected by the driver, wherein each button corresponds to one, two, three, or no flashes of the brake light.

Figure 2:
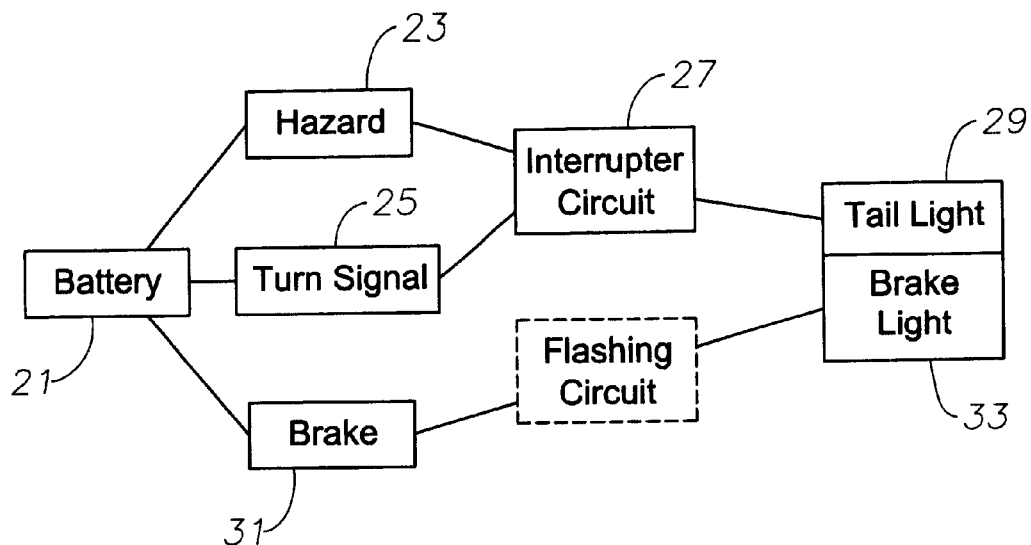
FIG. 2 is a prior art schematic diagram of the electronic system controlling the tail and brake light of the vehicle of FIG. 1.

Referring to FIG. 2, a battery 21 preferably provides the power to illuminate the rear lights of the vehicle. In a typical circuit, battery 21 is connected to a hazard encoder 23, which receives a mechanical position of hazard switch 17 and translates that position to an electrical signal. Battery 21 also connects to a turn signal encoder 25, which receives mechanical input from the turn signal of the vehicle so that various illuminations can be communicated by the rear lights of the vehicle. An interrupter circuit 27 is positioned between hazard encoder 23 and turn signal encoder 25 and a taillight 29 of the vehicle. Interrupter circuit 27 causes tail light 29 of the vehicle to flash intermittently in a manner known in the art whenever hazard encoder 23 or turn signal encoder 25 are actuated by their respective switches. Battery 21 typically also supplies power to brake switch 31 that is in electrical communication with brake lights 33. Typically, brake switch 31 is a circuit that is open until application of the brakes with the brake pedal by the driver of the vehicle. Therefore, brake lights 33 are not illuminated until the brake pedal of the vehicle is suppressed by the driver, thereby closing brake switch 31 for power to be communicated from battery 21 to brake lights 33.

Figure 3:
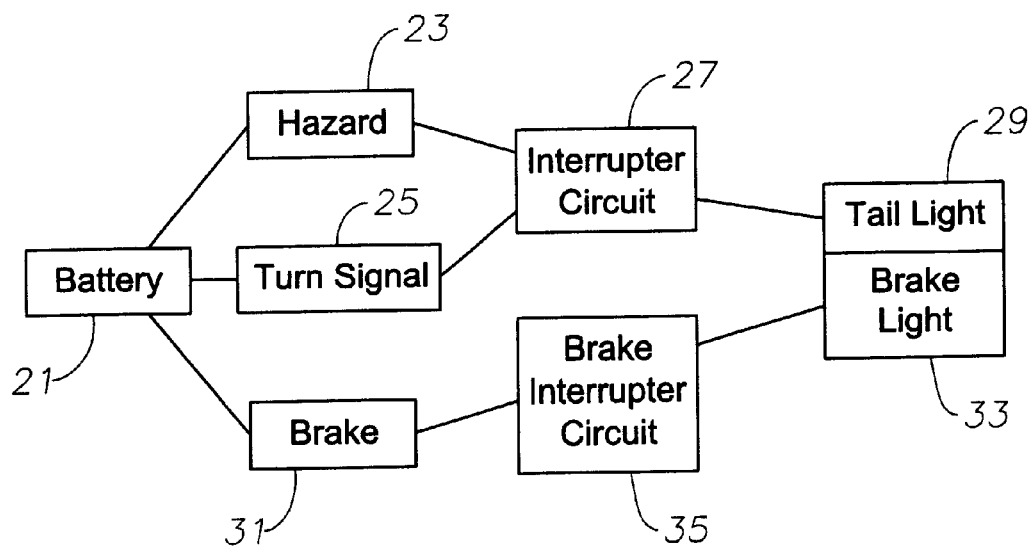
FIG. 3 is a schematic diagram of the electronic circuit of the brake light control assembly of FIG. 1.

Referring to FIG. 3, the present invention includes a brake interrupter circuit 35 positioned between brake switch 31 and brake lights 33. As shown in FIG. 3, brake light and tail lights 29, 33 may be single light bulbs that are connected to battery 21 through the circuitry as described above, having dual filaments to project different illuminations for hazard and turn signals versus brake light signals. Alternatively, brake light 33 can comprise a separate light bulb from the light bulbs of taillight 29.

Figure 4:
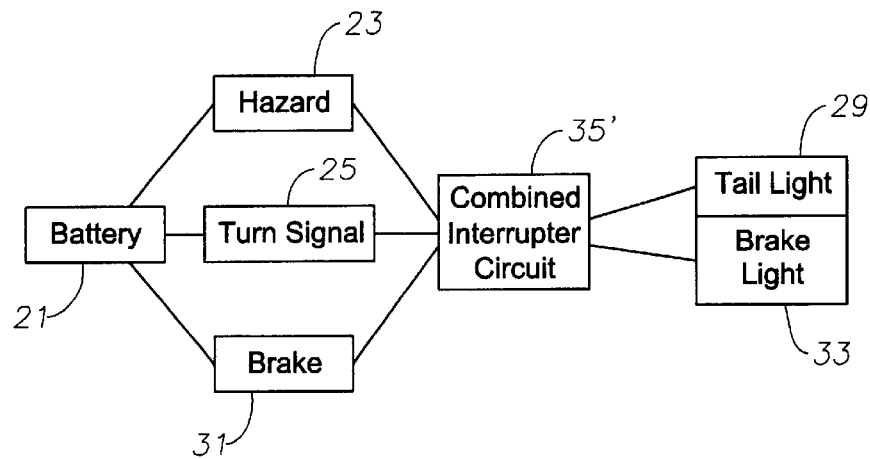
FIG. 4 is an alternative embodiment of the electrical circuit of the brake light control assembly of the vehicle of FIG. 1.

In the preferred embodiment, a brake interrupter circuit 35 operates upon each application of brake switch 31 with the brake pedal of the vehicle. FIG. 3 shows a brake interrupter circuit 35 that is added to a vehicle that also has a separate taillight interruption circuit 27. FIG. 4 shows an alternative embodiment wherein interrupter circuit 27 and brake interrupter circuit 35 are combined in a combination interrupter circuit 35'. Combined circuit 35' would typically be used by the manufacturer of the vehicle as an original equipment manufacture (OEM) part. Combined interrupter circuit 35' interrupts hazard and turn signals as described above for the tail lights, as well as interrupting illumination of brake lights 33 in the manner described below. A portion of interruption circuit 35' is conventional for controlling flashing of taillights 29 and will not be deviated.

Figure 5:
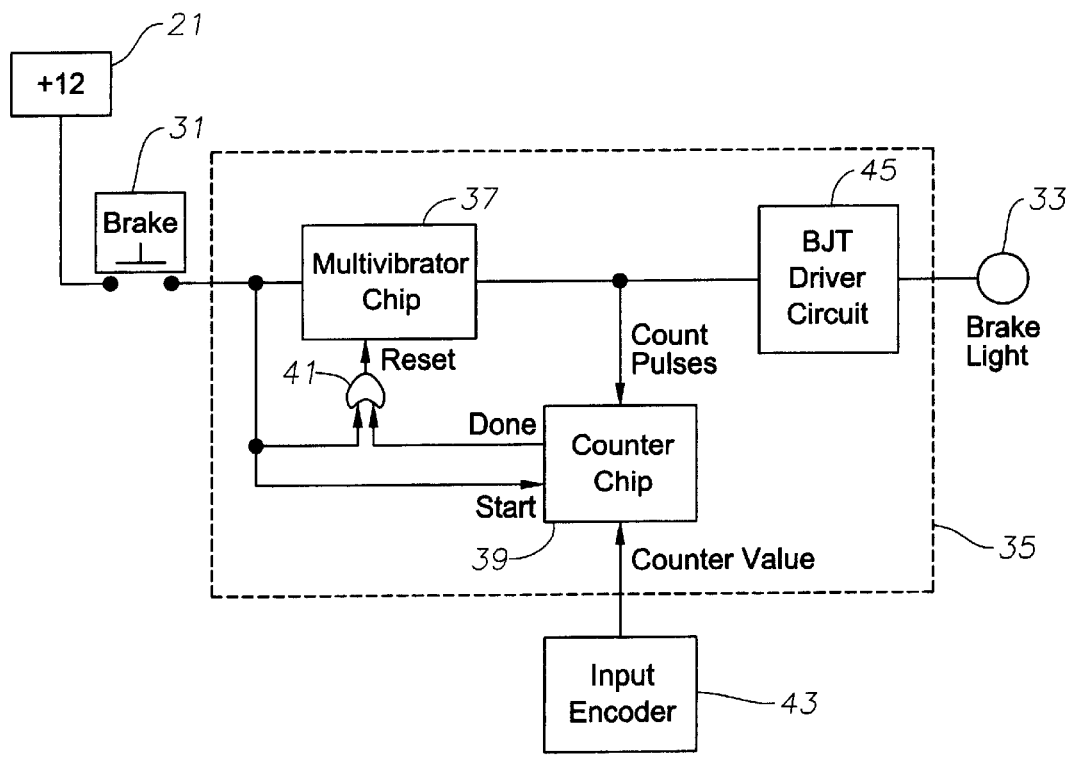
FIG. 5 is a detailed schematic diagram of the interrupter circuits shown in FIGS. 3 and 4.

Referring to FIG. 5, brake interrupter circuit 35, or the portion of combined interrupter circuit 35' that controls brake lights 33, comprises a multivibrator 37 that receives an electrical signal from battery 21 upon application of the brake pedal and brake switch 31. Multivibrator, or flasher 37 preferably includes a chip as known in the art for interrupting the electrical signal from battery 21 to brake light 33. Multivibrator 37 can also comprise magnetized coils that alternate charges upon the electrical current passing from battery 21 to brake lights 33, or any other manner known in the art for interrupting the electrical signal from battery 21 to brake light 33.

In the preferred embodiment, multivibrator 37 receives an electrical current from battery 21 upon application of the brake pedal and brake switch 31. Multivibrator 37 interrupts the current passing to brake light 33. The interrupted current from multivibrator 37 is also directed to a counter 39. Counter 39 can be a typical counter known in the art, and may comprise a counter chip that receives and counts the pulses of the interrupted electrical current from multivibrator 37. Counter 39 also receives electrical power from battery 21 upon application of the brake pedal and brake switch 31. Upon receiving electrical power from battery 21, counter 39 begins counting the electrical pulses of the electrical current exiting multivibrator 37. Counter 39 counts the pulses of interrupted electrical power exiting multivibrator 37 until a predetermined number of pulses have been generated by multivibrator 37, at which time counter 39 sends an electrical signal to deactivate multivibrator 37.

A multivibrator switch 41 is preferably located within circuit 35 between counter 39 and multivibrator 37. Multivibrator switch 41 receives electrical current from battery 21 upon application of the brake pedal in brake switch 31, as well as an electrical current from counter 39 after counter 39 registers the predetermined number of pulses from multivibrator 37. Before receiving an electrical signal from counter 39, multivibrator switch 41 allows multivibrator 37 to interrupt the pulses of electrical power from battery 21 to brake light 33. Upon receiving electrical power from counter 39, multivibrator switch 41 turns off or deactivates multivibrator 37, therefore allowing electrical current to flow continuously from battery 21 to brake light 33 as long as the brake pedal of brake switch 31 remains applied.

In the preferred embodiment, multivibrator 37, counter 39 and multivibrator switch 41 define a counter loop positioned electrically between battery 21 and brake light 33. In the preferred embodiment, the counter loop receives a signal from brake light control assembly 11 as to how many pulses of electrical power are to be sent to brake lights 33 before multivibrator 37 is turned off, thereby allowing continuous illumination of brake light 33 for the duration of the application of the brake pedal and brake switch 31.

An input encoder 43 communicates to counter 39 the preselected number of pulses that are desired to be generated by multivibrator 37 before deactivation. Input encoder 43, in a manner known in the art, converts the mechanical position of brake flasher light switch 19 to electrical signals for interrupter circuit 35. For example, various positions of switch 19 along brake light control assembly 11 can correspond to varying resistances of electrical power going into counter 39, thereby signaling counter 39 that the driver of the vehicle desires one predetermined number of flashes over another before brake light 33 is continuously illuminated.

In the preferred embodiment, when switch 19 is in its first position input, encoder 43 communicates a signal to counter 39 that allows counter 39 to register one pulse before sending the signal to multivibrator switch 41 to deactivate multivibrator 37. In the preferred embodiment, when switch 19 is in the second position, input encoder 43 sends a signal for counter 39 to count two pulses before sending the signal to multivibrator switch 41 to turn off multivibrator 37. In the preferred embodiment, when switch 19 is in the third position, input encoder 43 sends a signal to counter 39 to count three pulses before sending the electrical signal to multivibrator switch 41 to turn off multivibrator 37 and allow brake light to remain illuminated for the duration of the application of brake switch 31. In the preferred embodiment, when switch 19 is in its no flash, zero, or off position, input encoder 43 sends a signal to counter 39 so that counter 39 automatically sends a signal to multivibrator switch 41 to turn off multivibrator 37 upon application of the brake pedal and brake switch 31. Therefore, in the zero or off position of switch 19, brake lights 33 are continuously illuminated upon application of the brake pedal and brake switch 31.

In the preferred embodiment, a driver circuit 45 is located between multivibrator 37 and brake lights 33. Typically, the electrical current powering multivibrator 37 and counter 39 has a voltage that is less than necessary to illuminate brake lights 33. Therefore, the exiting current from multivibrator 37, whether interrupted or continuous, preferably passes through driver circuit 45 for converting the voltage to a value capable of illuminating brake lights 33. Driver circuit 45 can be a bi-polar junction transistor as known in the art, for converting the lower voltage current used in electrical circuit 35 to the higher voltage current necessary for brake lights 33.

In operation, brake light control assembly 11 allows the driver of the vehicle to control the number of flashes or interruptions of brake lights 33 based upon the position of switch 19. Switch 19 of brake flasher light assembly allows the driver of the vehicle to determine how many times brake lights 33 flash before remaining continuously lit throughout the duration of the application of brake switch 31, as desired. The number of illuminations may vary from driver to driver depending upon road conditions and traffic conditions. For example, in hazardous weather, the driver may desire that there are multiple illuminations of the brake lights 33 before remaining continuously lit so that following drivers can easily appreciate that the driver's vehicle is slowing down. In better conditions, the driver may feel that there is no need for multiple flashes before continuous brake illumination, or the driver may desire a single flash before continuous illumination of brake lights 33.

Manually operable switch 19 allows the illumination pattern of brake lights 33 to be controlled by the driver as desired. Switch 19 does not depend upon sensors or signals pertaining to the driving conditions and traffic conditions in order for the brake lights 33 to be illuminated in various ways. Rather, brake lights 33 either do not flash or flash once, twice, thrice, as desired depending upon the position of switch 19 as manually selected by the driver each time the brake pedal of brake switch 31 is applied until switch 19 is moved to a different position. Additionally, by allowing the driver to determine the number of flashes of brake lights 33 depending upon the position of switch 19, the driver can easily ascertain the brake signals that are communicated to following drivers by simply viewing the position of switch 19 on brake light control assembly 11.

As will be readily appreciated by those skilled in the art, brake light control assembly 11 is readily capable of being connected to various locations within the vehicle. For example, brake light control assembly 11 could easily be adapted to be positioned on the console between the driver seat and passenger seat of the vehicle. The brake flasher light assembly could also easily be positioned at various locations along the dashboard of the vehicle. The positioning of brake light control assembly 11 will primarily be a decision of ergonomics that would be determined by manufacturers of the various automobiles, depending upon various criteria that are not important to the application and operation of brake light control assembly 11. Further, it will also be apparent to those skilled in the art that modification, changes and substitutions may be made to the invention and the foregoing disclosure. Accordingly, it is appropriate that the appended claims be construed broadly and in a manner consistent with the spirit and scope of the invention herein. For example, brake interrupter circuit 35 could alternatively comprise various other pieces of electrical circuitry that could cause the same interruption of electrical power as multivibrator 37 without departing from the spirit and scope of this invention.

Further, it will also be apparent to those skilled in the art that modifications, changes and substitutions may be made to the invention in the foregoing disclosure. Accordingly, it is appropriate that the appended claims be construed broadly and in the manner consistent with the spirit and scope of the invention herein.

What claimed is:

1. A brake light control assembly, comprising:

a brake light interrupter circuit adapted to be connected to a vehicle with brake lights for selectively interrupting illuminations of the brake light a predetermined number of times; and a manually actuable switch that is selectively positioned to vary the predetermined number of times the illuminations of the brake lights are interrupted by the interrupter circuit upon each actuation of the brake assembly.

2. The brake light control assembly of claim 1, wherein the switch is adapted to be mounted adjacent a steering column of the vehicle.

3. The brake light control assembly of claim 1, wherein the switch has one position that disables the interruption circuit.

4. The brake light control assembly of claim 1, wherein the switch has one position that causes the interruption circuit to interrupt the illuminations a selected number of times and another position that causes the interruption circuit to interrupt the illuminations a selected number of times that is greater than said one position.

5. The brake light control assembly of 1, further comprising a switch encoder for translating the position of the switch into an electronic signal for the interruption circuit.

6. The brake light control assembly of claim 1, wherein the switch has a first position that causes the interruption circuit to interrupt the illuminations a selected number of times and a second position that causes the interruption circuit to interrupt the illuminations a selected number of times that is greater than the first position, and has the switch has a third position that disables the interruption circuit.

7. In a vehicle having a brake engaging assembly, a brake light, a battery for illuminating the brake lights that is in electrical communication with the brake light when the brake engaging assembly is actuated, a brake light control assembly comprising:

a brake light interrupter circuit that selectively interrupts an electrical current from the battery to the brake lights when the brake engaging assembly is actuated; and a switch that selectively controls the number of interruptions of the electrical current, the switch being moveable between a plurality of switch positions, each position providing a different number of interruptions.

8. The brake light control assembly of claim 7, wherein the switch is manually operable.

9. The brake light control assembly of claim 7, further comprising a first switch position for positioning the switch such that electrical current from the battery is interrupted once and thereby causes the brake lights to flash only once before remaining illuminated.

10. The brake light control assembly of claim 9, further comprising a second switch position for positioning the switch such that the electrical current from the battery is interrupted twice and thereby causes the brake lights to flash only twice before remaining illuminated while the brake engaging assembly is actuated.

11. The brake light control assembly of claim 10, further comprising a third switch position for positioning the switch such that the electrical current from the battery is interrupted thrice and thereby causes the brake lights to flash only three times before remaining illuminated while the brake engaging assembly is actuated.

12. The brake light control assembly of claim 11, further comprising a fourth switch position for positioning the switch such that the electrical current from the battery is continuous, and thereby causing the brake lights to illuminate continuously while the brake engaging assembly is actuated.

13. The brake light control assembly of 7, further comprising a switch encoder for translating the position of the switch into an electronic signal for the brake light interrupter circuit.

14. A method for flashing brake lights of a vehicle each time a brake assembly of the vehicle is actuated, comprising:

providing a brake light control assembly that selectively interrupts illumination of the brake lights a predetermined number of times;

selecting the predetermined number of times the illuminations of the brake lights are interrupted; and actuating the brake assembly and in response thereto, causing the brake light control assembly to interrupt the illumination of the brake lights the number of times selected.

15. The method of claim 14, wherein the selecting step is performed by manually moving a switch between positions.

16. The method of claim 14, wherein before the selecting step, after the brake lights are interrupted for the selected number of times, causing the brake lights to remain illuminated continuously until the actuation of the brake assembly ceases.

* * * * *